US012442215B2

(12) United States Patent
Huang et al.

(10) Patent No.: US 12,442,215 B2
(45) Date of Patent: Oct. 14, 2025

(54) LOCK CORE DEVICE BASED ON MATCHING MULTIPLE KEY CROSS-SECTIONAL SHAPES, ITS BALL SLOT CONFIGURATION METHOD, AND ITS CORRESPONDING LOCKING KEY

(71) Applicant: TAIWAN FU HSING INDUSTRIAL CO., LTD., Kaohsiung (TW)

(72) Inventors: Chao-Ming Huang, Kaohsiung (TW); Chi-Ming Chen, Kaohsiung (TW)

(73) Assignee: Taiwan Fu Hsing Industrial Co., Ltd., Kaohsiung (TW)

( * ) Notice: Subject to any disclaimer, the term of this patent is extended or adjusted under 35 U.S.C. 154(b) by 313 days.

(21) Appl. No.: 18/304,554

(22) Filed: Apr. 21, 2023

(65) Prior Publication Data

US 2024/0271462 A1 Aug. 15, 2024

(30) Foreign Application Priority Data

Feb. 10, 2023 (TW) ................................. 112104768

(51) Int. Cl.
*E05B 27/00* (2006.01)

(52) U.S. Cl.
CPC ...... *E05B 27/0053* (2013.01); *E05B 27/0007* (2013.01)

(58) Field of Classification Search
CPC .. E05B 27/003; E05B 27/007; E05B 27/0017; E05B 27/02; E05B 27/0053;
(Continued)

(56) References Cited

U.S. PATENT DOCUMENTS 2,266,163 A 12/1941 Ching et al.
2,422,600 A 6/1947 Swanson et al.
(Continued)

FOREIGN PATENT DOCUMENTS

AU 2024200518 A1 8/2024
CA 1146375 A 5/1983
(Continued)

OTHER PUBLICATIONS

Office Action mailed to the Canadian Corresponding Patent Application No. 3197807 dated Sep. 5, 2024.
(Continued)

*Primary Examiner* — Kristina R Fulton
*Assistant Examiner* — Noah Horowitz
(74) *Attorney, Agent, or Firm* — Rosenberg, Klein & Lee

(57) ABSTRACT

A lock core device based on matching the cross-sectional shape of a multiple key and a corresponding lock key, the lock contains a keyway, and the outer contour of the keyway is configured as a first section contour and a second section contour after superimposition, and its' a union outer contour. By adapting to existing keys with various cross-sectional profiles, the lock cylinder does not need to be manufactured separately according to the cross-sectional profile of the key, thus effectively reducing its manufacturing and inventory costs; A method for configuring a lock ball slot so that, in response to the deviation of the position of the teeth of the keys with different cross-sectional profiles, the teeth of the keys with different cross-sectional profiles can correspond to the lock ball slot for unlocking, thus ensuring stability and effectiveness during unlocking.

19 Claims, 12 Drawing Sheets

(58) Field of Classification Search
CPC ........ E05B 35/08; E05B 35/10; E05B 35/105; E05B 35/14; E05B 19/0017; E05B 19/0023; E05B 19/0029; E05B 19/0035; E05B 19/0041; E05B 19/0052
See application file for complete search history.

(56) References Cited

U.S. PATENT DOCUMENTS

| | | | | |
|---|---|---|---|---|
| 2,807,158 | A | 9/1957 | Best | |
| 3,099,151 | A | 7/1963 | Schlage | |
| 3,175,379 | A | 3/1965 | Russel et al. | |
| 3,206,958 | A | 9/1965 | Best | |
| 3,338,078 | A | 8/1967 | Eberitch et al. | |
| 3,431,757 | A | 3/1969 | Hori | |
| 4,168,617 | A * | 9/1979 | Prunbauer | E05B 19/0029 70/411 |
| 4,368,629 | A * | 1/1983 | Prunbauer | E05B 19/0029 70/411 |
| 4,472,953 | A | 9/1984 | Gater | |
| 4,672,827 | A | 6/1987 | Craig | |
| 4,836,002 | A | 6/1989 | Monahan | |
| 4,912,953 | A | 4/1990 | Wobig | |
| 5,176,015 | A | 1/1993 | Sussina | |
| 5,513,509 | A * | 5/1996 | Bergen | E05B 27/00 70/370 |
| 5,799,519 | A | 9/1998 | Hsiao | |
| 6,314,744 | B1 | 11/2001 | Andersson | |
| 6,851,292 | B2 * | 2/2005 | Kruhn | E05B 19/0029 70/405 |
| 7,159,424 | B2 | 1/2007 | Widén | |
| 7,290,418 | B2 * | 11/2007 | Herdman | E05B 27/0053 70/343 |
| 7,533,550 | B2 | 5/2009 | Herdman | |
| 7,802,455 | B2 | 9/2010 | Herdman | |
| 8,117,876 | B2 * | 2/2012 | Mathachan | E05B 27/005 70/495 |
| 8,266,937 | B2 * | 9/2012 | Lienau | E05B 19/0023 70/405 |
| 8,347,675 | B2 | 1/2013 | Seliber | |
| 9,260,884 | B2 * | 2/2016 | Li | E05B 27/005 |
| 9,506,272 | B2 * | 11/2016 | Gerlings | B23C 3/35 |
| 10,273,716 | B2 * | 4/2019 | Huang | E05B 27/0021 |
| 10,808,421 | B2 * | 10/2020 | Clifford | E05B 27/0053 |
| 10,890,011 | B2 * | 1/2021 | Andersson | E05B 27/0042 |
| 11,613,910 | B2 * | 3/2023 | Clifford | E05B 27/0053 70/371 |
| 2006/0010945 | A1 * | 1/2006 | Herdman | E05B 27/005 70/383 |
| 2007/0017264 | A1 | 1/2007 | Seliber | |
| 2007/0193317 | A1 | 8/2007 | Herbman | |
| 2010/0018267 | A1 | 1/2010 | Huang | |
| 2010/0300161 | A1 | 12/2010 | Lin | |
| 2010/0319422 | A1 * | 12/2010 | Lienau | E05B 19/0023 70/493 |
| 2014/0290317 | A1 | 10/2014 | Li et al. | |
| 2017/0152678 | A1 | 6/2017 | Clifford | |
| 2019/0024410 | A1 | 1/2019 | Huang | |
| 2020/0024865 | A1 | 1/2020 | Clifford et al. | |
| 2024/0271463 | A1 | 8/2024 | Huang et al. | |

FOREIGN PATENT DOCUMENTS

| | | | |
|---|---|---|---|
| CA | 2184655 | A1 | 3/1997 |
| CN | 201401055 | Y | 2/2010 |
| CN | 102124176 | A | 7/2011 |
| CN | 103015805 | A | 4/2013 |
| CN | 102124176 | B | 9/2013 |
| CN | 203223073 | U | 10/2013 |
| CN | 203531524 | U | 4/2014 |
| EP | 0611862 | A2 | 8/1994 |
| EP | 2440726 | A1 | 4/2012 |
| TW | 444092 | B | 7/2001 |
| TW | 200811350 | A | 3/2008 |
| TW | I379935 | B | 12/2012 |
| TW | M581626 | U | 8/2019 |
| TW | M629828 | U | 7/2022 |
| TW | M643124 | U | 6/2023 |
| WO | 0134927 | A1 | 5/2001 |
| WO | 2011009281 | A1 | 1/2011 |
| WO | 2012021384 | A1 | 2/2012 |

OTHER PUBLICATIONS

Official Action mailed to Corresponding Australian Patent Application No. 2023202510 dated Jun. 27, 2024.
Office Action mailed to Taiwanese Counterpart Patent Application No. 112104768 on Dec. 6, 2023.
Examination Report mailed to Corresponding Australian Patent Application No. 2023202510 dated Feb. 10, 2023.
Examination Report mailed to Corresponding Australian Patent Application No. 2024200518 dated Feb. 22, 2025.
Official Action mailed to Corresponding Taiwanese Patent Application No. 112104768 dated Dec. 6, 2023.
Official Action mailed to Corresponding Taiwanese Patent Application No. 112145183 dated Aug. 9, 2024.
Official Action mailed to Corresponding Taiwanese Patent Application No. 112145634 dated Apr. 17, 2024.
Examination Report mailed to Corresponding Filipino Patent Application No. 2023/050202 dated Feb. 17, 2025.
Office Action mailed to related U.S. Appl. No. 18/411,003 dated May 19, 2025.
Examination Report mailed to Corresponding Taiwanese Patent Application No. 114111254 dated May 8, 2025.
Official Action mailed to Corresponding Canadian Patent Application No. 3227323 dated May 23, 2025.

* cited by examiner

LOCK CORE DEVICE BASED ON MATCHING MULTIPLE KEY CROSS-SECTIONAL SHAPES, ITS BALL SLOT CONFIGURATION METHOD, AND ITS CORRESPONDING LOCKING KEY

TECHNICAL FIELD

The present invention relates to a lock core device based on matching multiple key cross-sectional shapes, its ball slot configuration method, and its corresponding locking key, and more particularly to the lock cylinder including the keyway, and the outer contour of the keyway is configured as a first section contour and a second section contour after superimposition so as to adapted to the first lock key with the first section contour and the second lock key with the second section contour, thus adapting to existing keys with various cross-sectional profiles; and the method for configuring lock ball slots so that, in response to the deviation of the position of the teeth of the keys with different cross-sectional profiles, the teeth of the keys with different cross-sectional profiles can correspond to the lock ball slots for unlocking, thus ensuring stability and effectiveness during unlocking.

BACKGROUND

Conventionally, the lock is usually installed on the object used to lock and unlock, so as to achieve the effect of anti-theft and control by locking or unlocking the lock. As far as the configurations of the locks are concerned, most of the locks applied to lock/unlock the object. For example, the door includes a lock core arranged on an outer wall thereof. The lock core contains a keyway for receiving the key to lock or unlock the lock, and the lock core also contains a rotatable turn-button configured to be rotated by the user to lock/unlock the lock; wherein the lock core is connected with and is configured to drive the lock to be unlocked or locked, such that that when the key does not match with the lock core, the lock core cannot be rotated to unlock the lock.

The lock core is configured to accommodate a key corresponding to the lock core, and a keyway of the lock core is formed in any one of S shape, M shape, X shape, L shape, K shape, W shape, and Y shape, as illustrated in FIGS. 1*a* to 1*g*. The cross-sectional shape of the lock key corresponds to a shape of the keyway so that the lock key is received in the lock core. When the cross-sectional shape of the lock key does not correspond to the shape of the keyway, the lock key cannot be received in the keyway, thus avoiding unmatched key being received in the keyway and obtaining anti-fool and anti-theft effects.

However, the anti-theft effect of the lock depends on the lock balls of the lock core, and when matching the keyway with the lock key of the corresponding cross-sectional shape will lead to the inconsistency of the specifications, and it is required to have the manufacture and inventory of the lock core according to the different shapes of the keyway, thus increasing mold, processing, assembly and manufacture costs. In addition, the inventory cost will also increase, so it is not conducive to quantitative manufacture. For consumers, if the keyways cannot meet the lock keys of different cross-sectional shapes, even though the locking codes of the locks are the same, it is impossible to unlock the locks by using different lock keys, thus causing using inconvenience for the lock keys.

The present invention has arisen to mitigate and/or obviate the afore-described disadvantages.

SUMMARY

The primary aspect of the present invention is to provide a lock core device based on matching multiple key cross-sectional shapes which contains the keyway to facilitate an accommodation of at least two lock keys having different section contours, thus reducing manufacturing and inventory costs. When replacing the lock, the original key is applicable for another new lock, thus obtaining easy replacement of the lock.

Secondary aspect of the present invention is to provide a lock core device based on matching multiple key cross-sectional shapes which contains the hollow portion having the stop protrusion so that when replacing the at least one locking code set, the lock cylinder is rotated by the lock key, the respective one lock ball slot is aligned with the hollow portion, and the stop protrusion is removed to insert another new lock key with a new locking code set so that the respective one lock ball is replaceable in the lock cylinder to match with the new lock key, thus replacing the at least one locking code set. The lock is applicable for different lock keys having the same locking code set but different section contours by using the keyway, thus obtaining easy management and unlock to the lock based on using requirements.

Another aspect of the present invention is to provide a lock core device based on matching multiple key cross-sectional shapes which contains multiple lock ball slots being adapted to deviation of the positions of the teeth of the keys having different cross-sectional profiles, thus unlocking the lock stably and effectively.

To obtain above-mentioned aspects, a lock core device based on matching multiple key cross-sectional shapes provided by the present invention is adapted to a first lock key with a first section contour and a second lock key with a second section contour different from the first section contour of the first lock key. The lock core device contains: a lock cylinder including a keyway configured to receive the first lock key or the second lock key.

Preferably, an outer contour of the keyway is larger than or equal to an outer contour of a superimposition of the first section contour and the second section contour.

Preferably, the first section contour and the second section contour are in any one of S shape, M shape, X shape, L shape, K shape, W shape, and Y shape.

Preferably, the keyway includes a first edge and a second edge which are formed on two sides of the keyway, wherein the first edge and the second edge have an accommodation portion configured to receive the first lock key or the second lock key.

Preferably, the accommodation portion has a first straight fence extending from the first edge, a first tilted fence radially extending outward to the keyway from a bottom of the first straight fence, a first peripheral fringe extending from a bottom of the first tilted fence, a first support fringe radially extending inward to the keyway from a bottom of the first peripheral fringe, and at least one first extending fringe extending from a bottom of a second support fringe; the second edge of the keyway has a second straight fence corresponding to the first straight fence, a second tilted fence radially extending outward to the keyway from a bottom of the second straight fence, a second peripheral fringe extending from a bottom of the second tilted fence, a second support fringe radially extending inward to the keyway from a bottom of the second peripheral fringe, and at least one second extending fringe extending from a bottom of a second support fringe.

Preferably, the accommodation portion is recessed and radially corresponds to the first lock key or the second lock key.

Preferably, the lock cylinder includes multiple lock ball slots axially and spacedly defined thereon, a respective one lock ball slot axially extends along the lock cylinder and is configured to receive a respective one first lock ball of at least one first lock ball.

Preferably, the lock core device further contains a receiving sleeve which includes an accommodation groove axially defined on the receiving sleeve and configured to receive the lock cylinder, the receiving sleeve includes multiple notches corresponding to the at least one lock ball slot, and the receiving sleeve is configured to receive the at least one second lock ball.

Preferably, the receiving sleeve includes a hollow portion radially defined on an end thereof and corresponding to the respective one lock ball slot, and the hollow portion has a stop protrusion configured to shield the respective one lock ball slot.

Preferably, the receiving sleeve further includes a fixing element mounted on an outer periphery thereof, and the fixing element is configured to adhere the stop protrusion on the hollow portion.

Preferably, the first lock key includes multiple teeth, the second lock ley includes multiple teeth, the lock cylinder includes multiple lock ball slots axially and spacedly defined thereon, and a respective one lock ball slot radially extends along the lock cylinder. The lock core device further comprises multiple first lock balls accommodated in the multiple lock ball slots, when one of the first lock key and the second lock key is inserted into the keyway, a respective one first lock ball is driven by a respective one tooth which corresponds to the respective one first lock ball.

Preferably, the distance between the center of a middle lock ball slot and the center of the teeth of the first lock key is equal to the distance between the center of the middle lock ball slot and the center of the teeth of the second lock key.

Preferably, the multiple lock ball slots are spaced equidistantly.

Preferably, a key contains: a rod configured to match with the keyway of any one of claims 1-13, and a profile of a section contour of the rod corresponds to a profile of a section contour of the keyway.

Preferably, a method of configuring ball slot comprises steps of:

- providing a lock cylinder, wherein the lock cylinder includes a keyway, and an outer contour of the keyway is larger than or equal to an outer contour of a superimposition of a first section contour of a first lock key and a second section contour of a second lock key;
- providing multiple teeth on a side of each of the first lock key and the second lock key; and
- providing multiple lock ball slots axially and spacedly defined on the lock cylinder, wherein the multiple lock ball slots are in communication with the keyway.

Preferably, the method further contains a step of: selecting one of the multiple lock ball slots as a datum lock ball slot, and the other lock ball slots are spaced equidistantly so that a projection position of the respective one lock ball slot partially corresponds to the teeth of the first lock key and the second lock key.

Preferably, the method further contains a step of: selecting a middle one of the multiple lock ball slots as a datum lock ball slot so that a projection position of the middle lock ball slot corresponds to the tooth of the first lock key and the second lock key, and the other lock ball slots beside the middle lock ball slot are spaced equidistantly.

DETAILED DESCRIPTION

With reference to FIGS. 2-5, a lock core device based on matching multiple key cross-sectional shapes according to a preferred embodiment of the present invention is adapted to a first lock key 2 with a first section contour A and a second lock key 3 with a second section contour B different from the first section contour A of the first lock key 2.

The lock core device comprises a lock cylinder 1 including a keyway 11 configured to receive the first lock key 2 or the second lock key 3.

Figure 6:
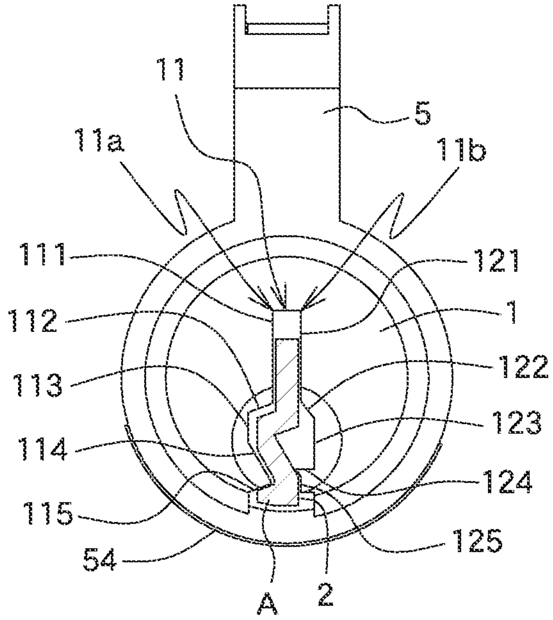
FIG. 6 is a cross sectional view showing the operation of a part of a first lock key received in the keyway of the lock core device according to the present invention.
Figure 7:
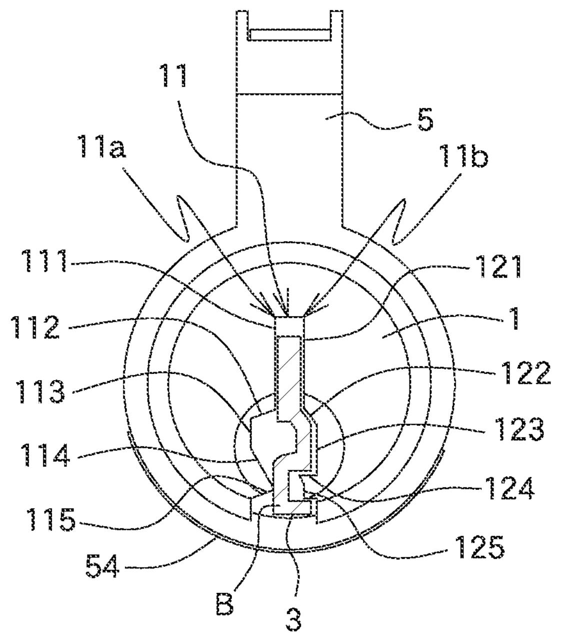
FIG. 7 is a cross sectional view showing the operation of a part of a second lock key received in the keyway of the lock core device according to the present invention.

In this embodiment, an outer contour of the keyway 11 is larger than or equal to an outer contour of a superimposition of the first section contour A and the second section contour B. Referring to FIGS. 1*a* to 1*g*, the first section contour A and the second section contour B are in any one of S shape, M shape, X shape, L shape, K shape, W shape, and Y shape. The keyway 11 is configured to receive the first lock key 2 with the first section contour A (as shown in FIG. 6) or the second lock key 3 with the second section contour B (as illustrated in FIG. 7).

It is to be noted that a section contour of the keyway 11 corresponds to a portion of the lock key inserted into the lock cylinder 1 and having no teeth.

Figure 1A:
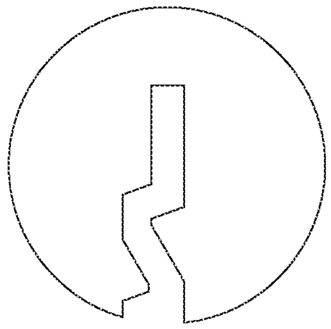
FIG.1a (PRIOR ART)
FIG. 1*a* is a cross sectional view of a conventional keyway in an S shape.
Figure 1B:
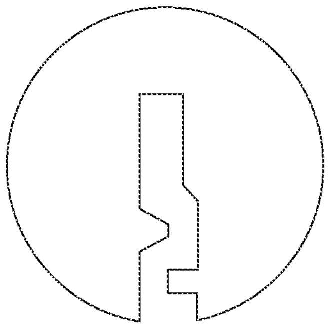
FIG.1b (PRIOR ART)
FIG. 1*b* is a cross sectional view of a conventional keyway in a M shape.
Figure 1C:
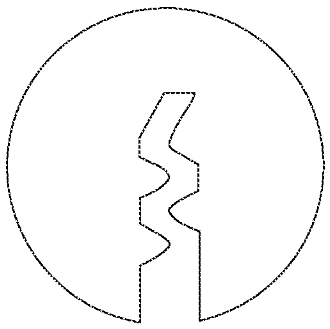
FIG.1c (PRIOR ART)
FIG. 1*c* is a cross sectional view of a conventional keyway in an X shape.
Figure 1D:
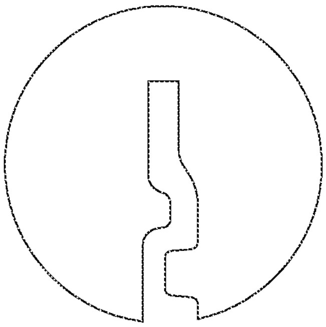
FIG.1d (PRIOR ART)
FIG. 1*d* is a cross sectional view of a conventional keyway in an L shape.
Figure 1E:
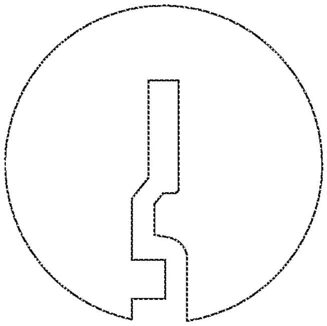
FIG.1e (PRIOR ART)
FIG. 1*e* is a cross sectional view of a conventional keyway in a K shape.
Figure 1F:
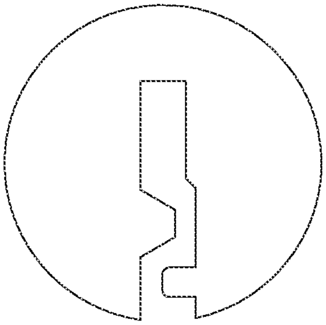
FIG.1f (PRIOR ART)
FIG. 1*f* is a cross sectional view of a conventional keyway in a W shape.
Figure 1G:
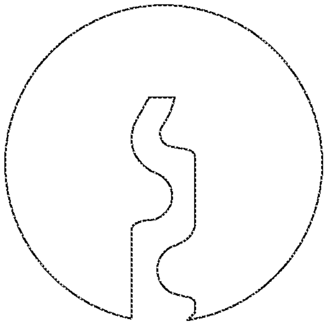
FIG.1g (PRIOR ART)
FIG. 1*g* is a cross sectional view of a conventional keyway in a Y shape.
Figure 2:
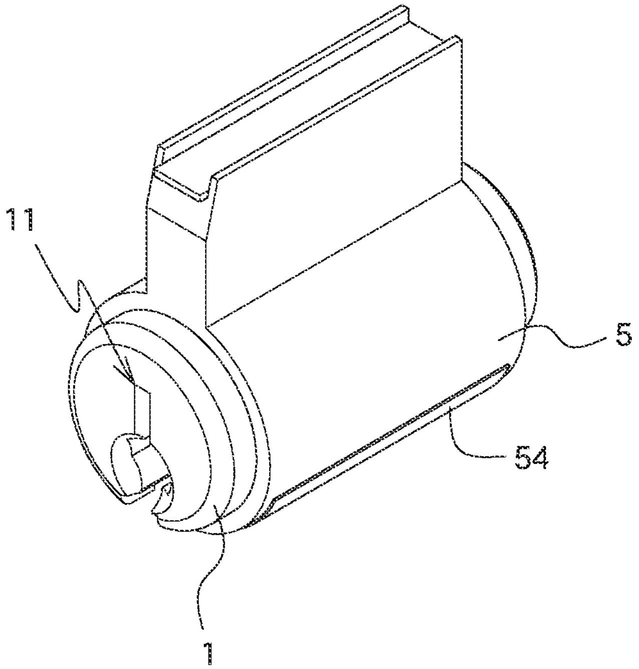
FIG. 2 is a perspective view showing the assembly of a lock cylinder and a receiving sleeve of a lock core device according to the present invention.
Figure 3:
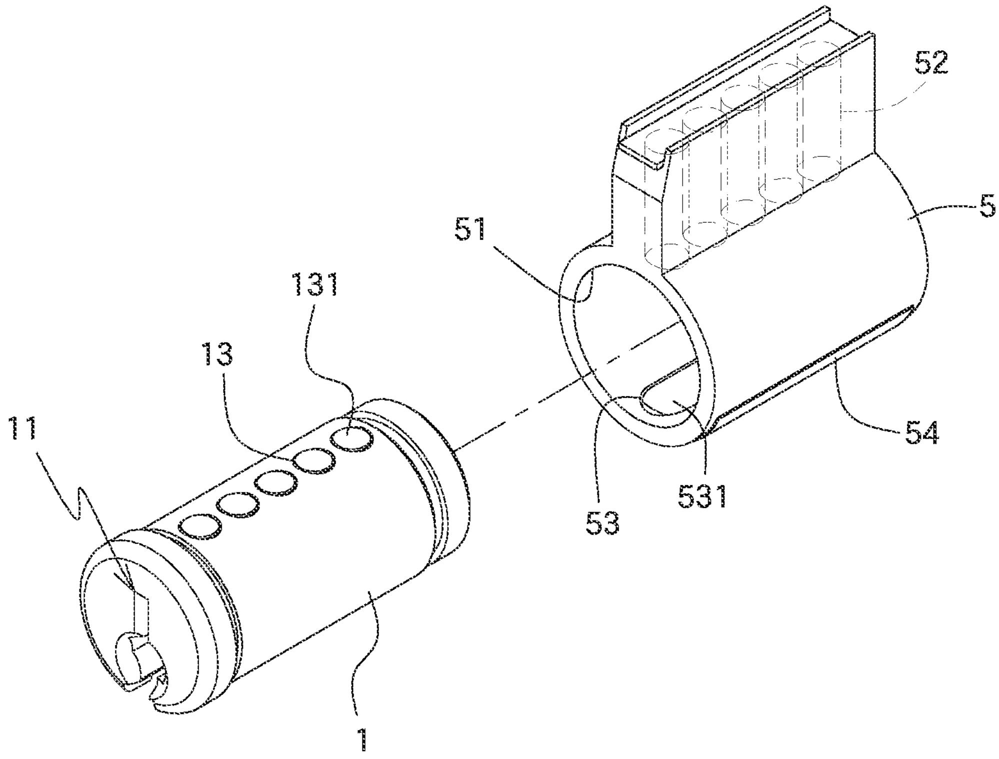
FIG. 3 is a perspective view showing the exploded components of the lock cylinder and the receiving sleeve of the lock core device according to the present invention.
Figure 4:
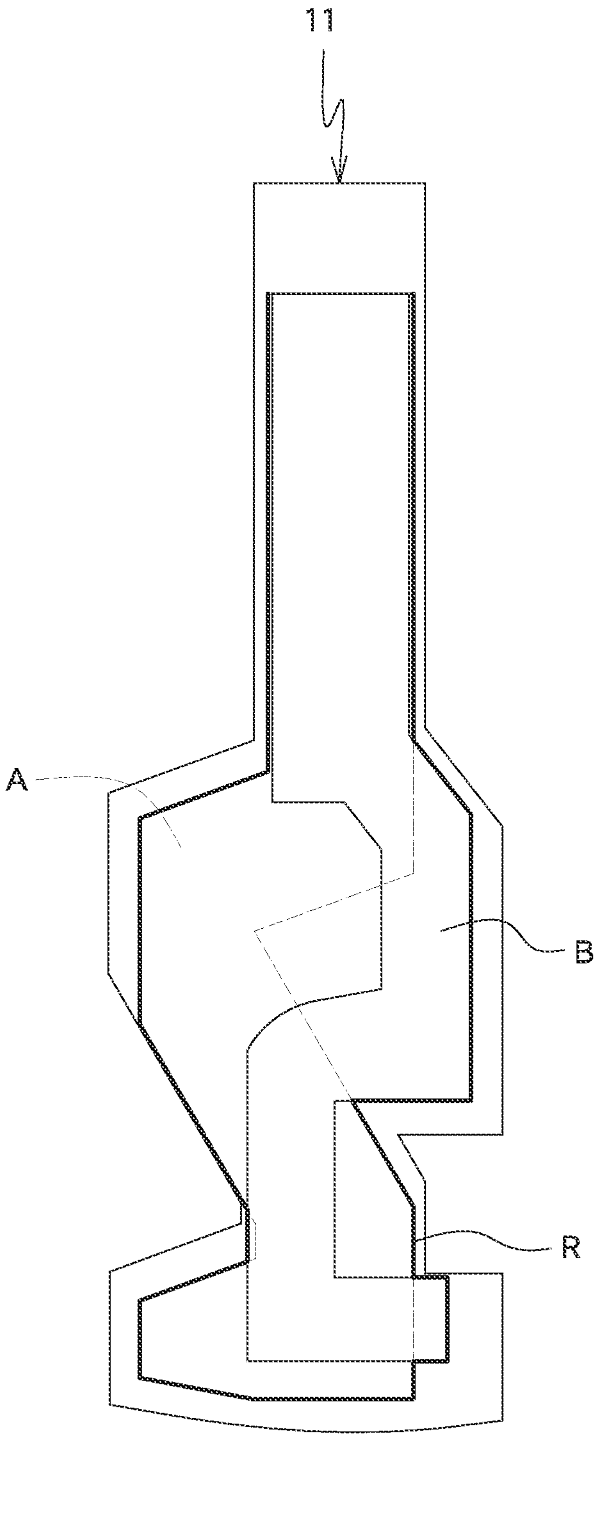
FIG. 4 is a side plan view showing the superimposition of a first section contour A and a second section contour B corresponding to a keyway of the lock core device according to the present invention.
Figure 5:
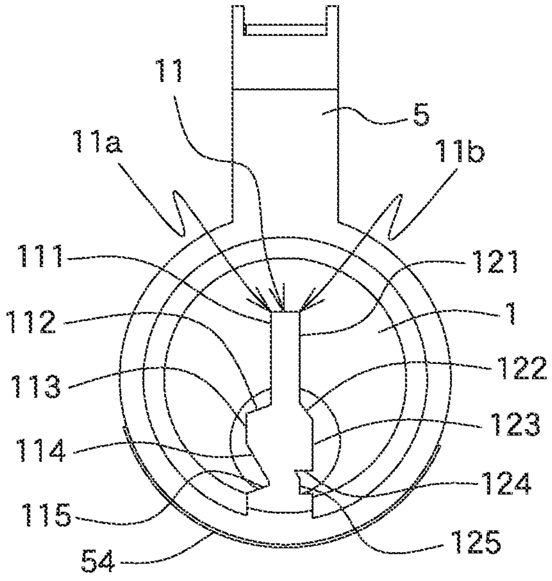
FIG. 5 is a front plan view showing the assembly of the keyway of the lock core device according to the present invention.
Figure 8A:
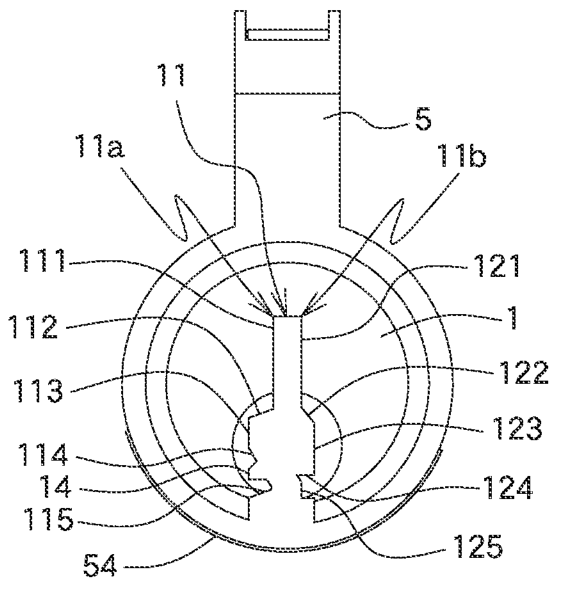
FIG. 8*a* is a side plan view showing the assembly of an accommodation portion on a first edge of the lock core device according to the present invention.
Figure 8B:
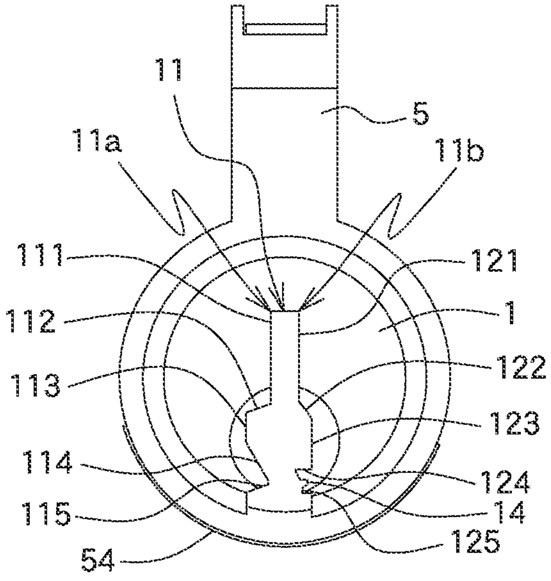
FIG. 8*b* is a side plan view showing the assembly of an accommodation portion on a second edge of the lock core device according to the present invention.
Figure 8C:
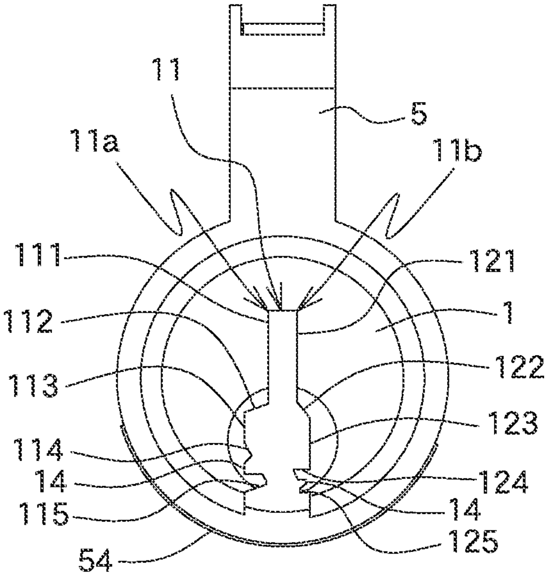
FIG. 8*c* is a side plan view showing the assembly of an accommodation portion on the first edge and the second edge of the lock core device according to the present invention.

In this embodiment, the keyway 11 matches with the first section contour A in the S shape as shown in FIG. 1*a*, and the keyway 11 matches with the second section contour B in the K shape as shown in FIG. 1*a*, after the superimposition of the first section contour A and the second section contour B, a union outer profile R is produced as shown in FIGS. 4 and 5, hence the keyway 11 is configured to receive the first lock key 2 in the S shape and the second lock key 3 in the K shape. In this embodiment, the keyway 11 includes a first edge 11*a* and a second edge 11*b* which are formed on two sides of the keyway 11, wherein at least one of the first edge 11*a* and the second edge 11*b* has an accommodation portion 14 configured to receive the first lock key 2 or the second lock key 3, wherein a section contour of the accommodation portion 14 can be in various geometry shapes to support the first lock key 2 or the second lock key 3. In this embodiment, a first straight fence 111 extends from the first edge 11*a*, a first tilted fence 112 radially extends outward to the keyway 11 from a bottom of the first straight fence 111, a first peripheral fringe 113 extends from a bottom of the first tilted fence 112, a first support fringe 114 radially extends inward to the keyway 11 from a bottom of the first peripheral fringe 113, and at least one first extending fringe 115 extends from a bottom of the first support fringe 114. The second edge 11*b* of the keyway 11 has a second straight fence 121 corresponding to the first straight fence 111, a second tilted fence 122 radially extending outward to the keyway 11 from a bottom of the second straight fence 121, a second peripheral fringe 123 extending from a bottom of the second tilted fence 122, a second support fringe 124 radially extending inward to the keyway 11 from a bottom of the second peripheral fringe 123, and at least one second extending fringe 125 extending from a bottom of a second support fringe 124, wherein the second support fringe 124 is perpendicular to the second extending fringe 125. With reference to FIG. 6, when the first section contour A of the first lock key 2 is in the S shape and is received in the keyway 11, a side of the first lock key 2 abuts against the first straight fence 111, the first tilted fence 112, the first peripheral fringe 113, the first support fringe 114 and the first extending fringe 115, and the first lock key 2 is supported by the first support fringe 114. Referring to FIG. 7, when the second lock key 3 is received in the keyway 11 and the second section contour B is in the K shape, a side of the second lock ley 3 abuts against the second straight fence 121, the second tilted fence 122, the second peripheral fringe 123, the second support fringe 124 or the second extending fringe 125. As shown in FIGS. 8*a* to 8*c*, in another embodiment, the accommodation portion 14 is recessed and is formed on the first edge 11*a* or the second edge 11*b* or is formed on the first edge 11*a* and the second edge 11*b* to radially correspond to the first lock key 2 or the second lock key 3, thus enhancing a support capacity of the lock core device after inserting the first lock key 2 or the second lock key 3 to the lock cylinder 1 to push lock balls of the lock cylinder 1 accurately. Thereby, the keyway 11 facilitates an accommodation of the first lock key 2 with the first section contour A and the second lock key 3 with the second section contour B, thus reducing manufacturing and inventory costs. When replacing the lock, and when the original key 4 having the first section contour A or the second section contour B, the original key 4 is applicable for another new lock, thus obtaining easy replacement of the lock.

Figure 9:
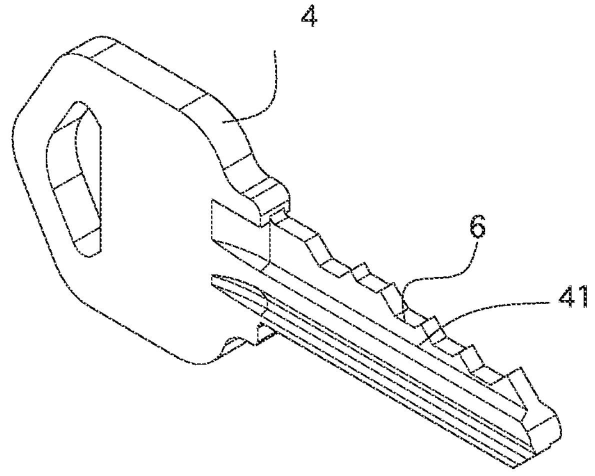
FIG. 9 is a perspective view showing the assembly of a lock key according to the present invention.
Figure 10:
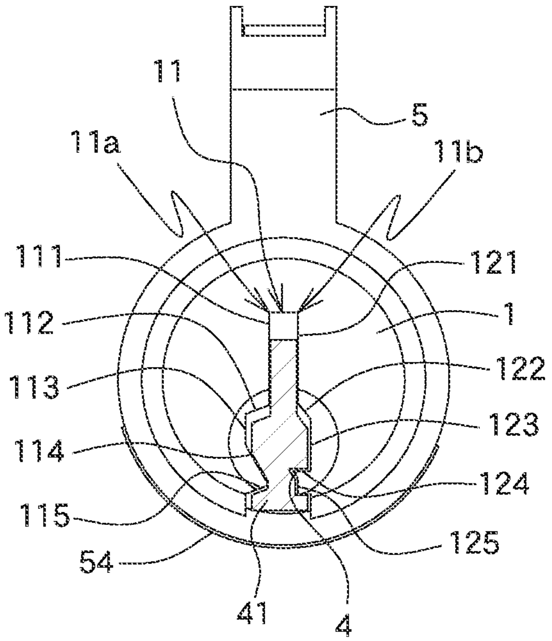
FIG. 10 is a cross sectional view showing the operation of a part of the lock key received in the keyway of the lock core device according to the present invention.

In another embodiment, referring to FIGS. 9 and 10, the original key 4 is configured to match with the keyway 11 and includes a rod 41, wherein a profile of a section contour of the rod 41 corresponds to a profile of a section contour of the keyway 11 as shown in FIGS. 9 and 10 so as to be solely cooperated with the keyway 11 of the present invention. The lock core device can be used in conjunction with three different keys 4 with different cross-section shapes.

The lock cylinder 1 includes multiple lock ball slots 13 axially and spacedly defined thereon, wherein a respective one lock ball slot 13 radially extends along the lock cylinder 1. A receiving sleeve 5 includes an accommodation groove 51 axially defined on the receiving sleeve 5 and configured to receive the lock cylinder 1, and the receiving sleeve 5 includes multiple notches 52 corresponding to the multiple lock ball slots 13, wherein a respective one lock ball slot 13 is configured to receive a respective one first lock ball 131 of multiple first lock balls 131, and a respective one notch 52 corresponds to a respective one second lock ball of multiple second lock ball (not shown), wherein at least one lock code set is defined on a length between the respective one second lock ball and the respective one first lock ball 131, such that when the original key 4 is inserted into the keyway 11, teeth 6 of the rod of the original key correspond to the respective one lock ball slot 13, abut against the respective one first lock ball 131, and pushes the respective one second lock ball so that the lock cylinder 1 is rotatably unlocked, when a contact surface of the respective one first lock ball 131 and the respective one second lock ball corresponds to a connection portion of the lock cylinder 1 and the receiving sleeve 5. The lock cylinder 1 includes an adjustable screw nut and a driven structure (not shown) arranged on an end of the lock cylinder 1 opposite to the keyway 11 so as to drive a lock tongue (not shown) of the lock cylinder 1 of the lock, thus unlocking the lock.

Figure 11:
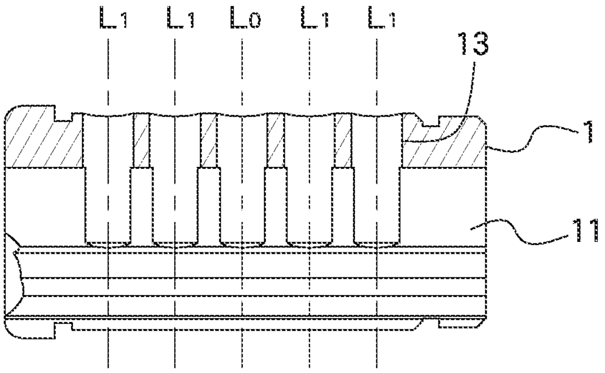
FIG. 11 is a cross sectional view showing the operation of the lock cylinder and multiple lock ball slots of the lock core device according to the present invention.
Figure 12:
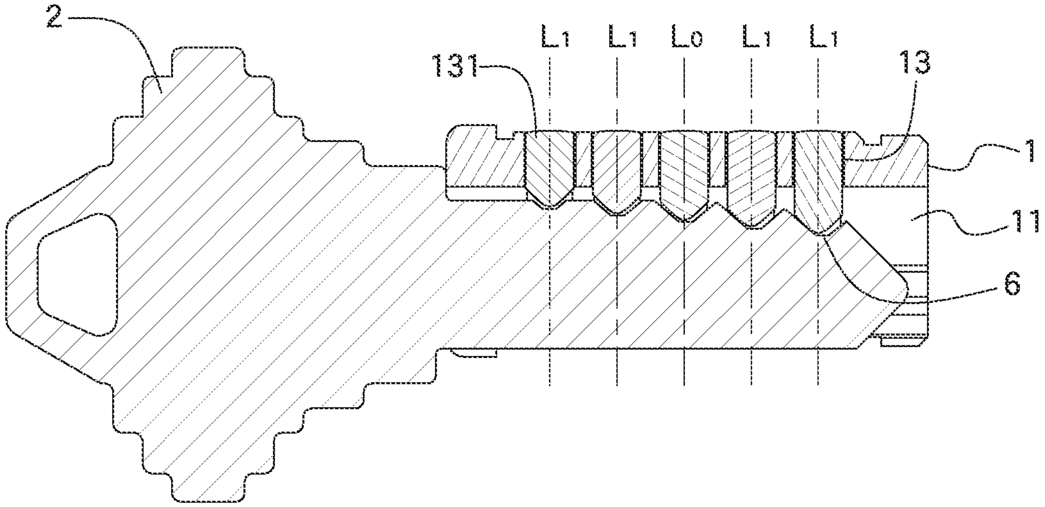
FIG. 12 is a cross sectional view showing the operation of the first lock key and the lock cylinder of the lock core device according to the present invention.
Figure 13:
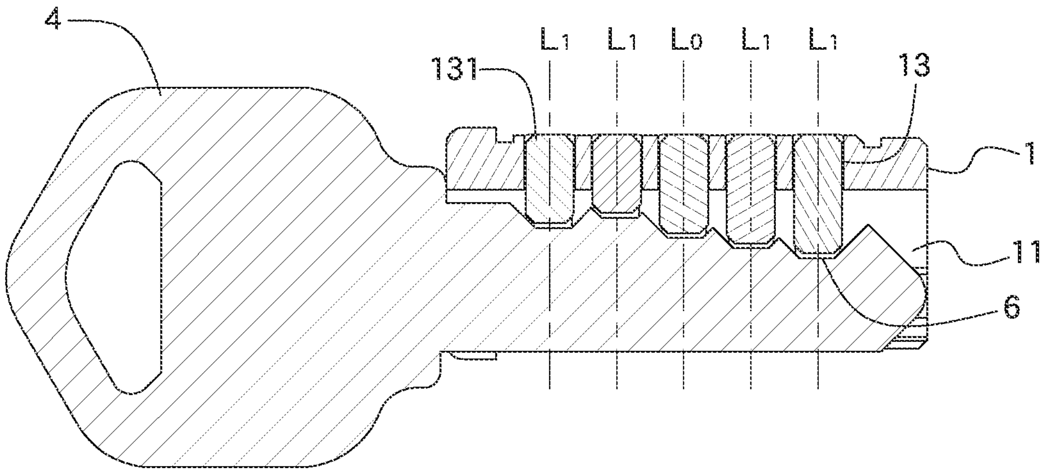
FIG. 13 is a cross sectional view showing the operation of the first lock key and the lock cylinder of the lock core device according to the present invention.

As far as the configuration of the multiple lock ball slots 13 are concerned, due to the lock keys with different cross-section contours, there may be slight deviations for the teeth in the axial direction. In order to enable effective insertion and unlocking of lock keys with different section contours, the lock cylinder 1 includes the multiple lock ball slots 13 radially defined thereon and corresponding to the teeth of the first lock key 2 and the second lock key 3, wherein the multiple lock ball slots 13 are in communication with the keyway 11. To comply with the deviation of the axial position to the teeth of the first lock key 2 and the second lock key 3, a diameter of the respective one lock ball slot 13 is large. In another embodiment, the teeth of the first lock key 2 and the second lock key 3 contact with the multiple lock ball slots 13 and are deviated equidistantly. Thereby, the diameter of the respective one lock ball slot 13 is equal to or larger than a diameter of a respective one lock ball slot of the conventional lock key. A projection position of the respective one lock ball slot 13 partially corresponds to the teeth of the first lock key 2 and the second lock key 3 so that a respective one tooth of the first lock key 2 and the second lock key 3 is aligned with the respective one lock ball slot to abut against the respective one first lock ball 131. In another embodiment, the multiple lock ball slots 13 are spaced equidistantly, wherein an initial datum lock ball slot 13 is configured to completely correspond to a tooth of the first lock key 2 and the second lock key 3, wherein when the initial datum lock ball slot 13 is a front lock ball slot 13 or a distal lock slot 13 of the multiple lock ball slots 13, a deviation between a axial position of another lock ball slot 13 opposite to the front lock ball slot 13 or the distal lock slot 13 and the tooth of the first lock ley 2 or the third lock key 3 is increased. Referring to FIGS. 11 to 13, the lock cylinder 1 includes five locking code sets and the initial datum lock ball slot 13 is a middle one of the multiple lock ball slots 3, wherein a projection position of a datum axis $L_0$ corresponds to the tooth of the first lock ley 2 or the third lock key 3, and multiple deviation axes $L_1$ are spaced from the datum axis $L_0$, wherein a fixed distance is defined between any two adjacent deviation axes $L_1$, and the other lock ball slots 13 are drilled along the multiple deviation axes $L_1$, thus drilling the multiple lock ball slots 13 easily. The distance between the center of a middle lock ball slot and the center of the teeth of the first lock key is equal to the distance between the center of the middle lock ball slot and the center of the teeth of the second lock key. Furthermore, when the multiple lock ball slots 13 are defined by an equidistant offset in the axial direction, an axial deviation among two distal lock ball slots 13 and the teeth of the first lock key 2 or the second lock key 3 is eliminated or minimized. Accordingly, the first lock key 2 or the second lock key 3 is aligned with and abuts against the respective one lock ball slot 13 or the respective one first lock ball 131 of the respective one lock ball slot 13 which corresponds to the first lock key 2 or the second lock key 3, thus unlocking the lock stably and effectively. In other embodiments, the lock cylinder 1 includes six locking code sets or at least one locking code set. When a number of the at least one locking code set of the lock cylinder 1 is an odd number, the middle lock ball slot 13 is the datum lock ball slot, and the positions of the other lock ball slots are adjustable. When a number of the at least one locking code set of the lock cylinder 1 is an even number, one of two middle lock ball slots 13 is selected to be used as the datum lock ball slot, and the other lock ball slots 13 are adjustable. Alternatively, a central position of two centers of the two middle lock ball slots are used as a datum position configured to adjust the positions of the other lock ball slots 13.

Figure 14:
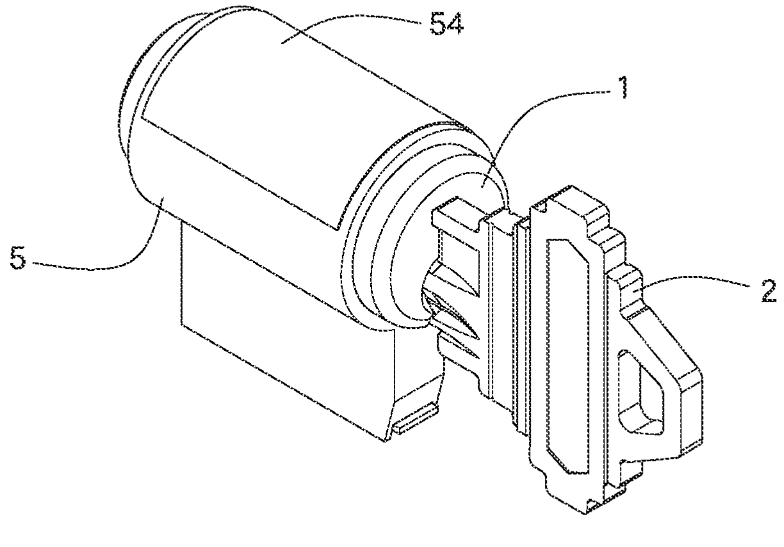
FIG. 14 is a perspective view showing the assembly of the second lock key and the lock cylinder of the lock core device after replacing locking code sets of the first lock key according to the present invention.
Figure 15:
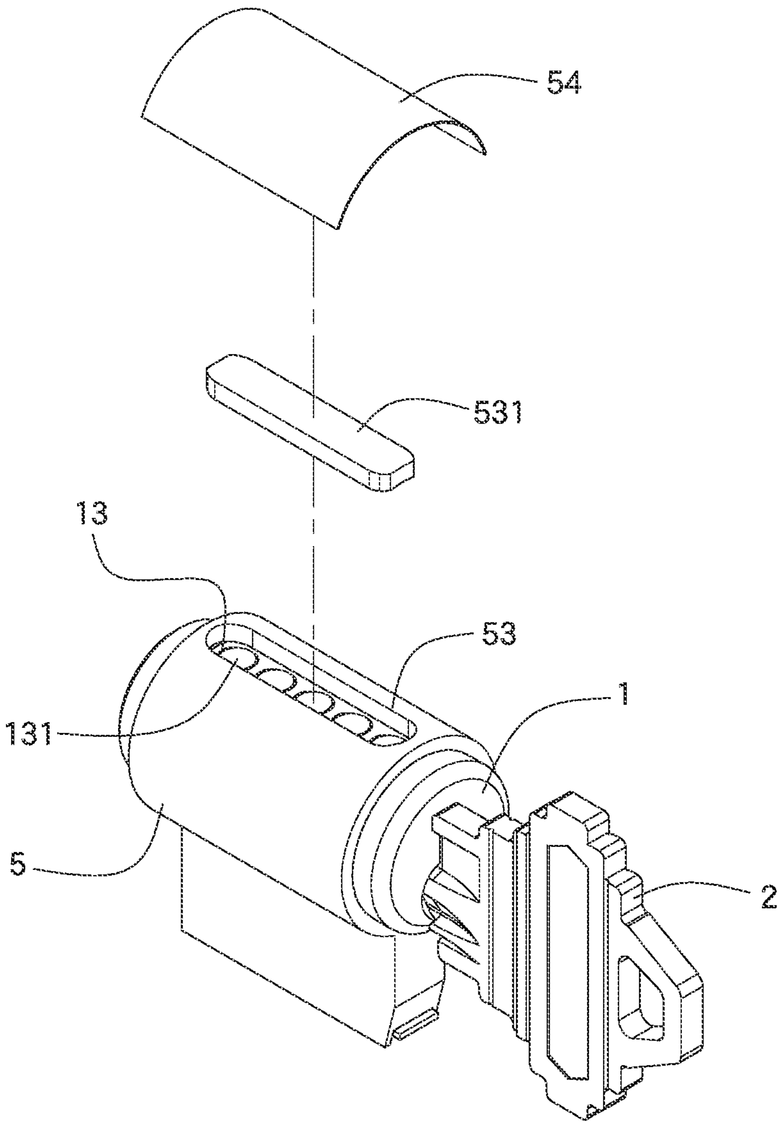
FIG. 15 is a perspective view showing the exploded components of the second lock key and the lock cylinder of the lock core device after replacing the first lock key according to the present invention.

It is to be noted that besides a deviation will occur to the axial positions of the teeth of the first lock key and the second lock key having different contours, the radial positions of the teeth of the first lock key and the second lock key may be different, because they adapt different coding systems. Correspondingly, the multiple first lock balls 131 have different height standards (as illustrated in FIGS. 12 and 13) to comply with different coding systems. Therefore, to comply with the keys adapting different coding systems, there's a need to replace the multiple first lock balls 131 in the lock cylinder 1. There are many ways to replace the multiple first lock balls 131, for example, a user can replace the multiple first lock balls 131 before inserting the lock cylinder 1 into the receiving sleeve 5. Preferably, the multiple first lock balls 131 are replaced as illustrated in FIGS. 14 and 15. The receiving sleeve 5 includes a hollow portion 53 radially defined on an end thereof and corresponding to the respective one lock ball slot 13, and the hollow portion 53 has a stop protrusion 532 configured to shield the respective one lock ball slot 13. The receiving sleeve 5 further includes a fixing element 54 mounted on an outer periphery thereof, wherein the fixing element 54 is a sticker and is configured to adhere the stop protrusion 532 on the hollow portion 53. To replace the multiple first lock balls 131, first insert the lock key in the lock cylinder 1, and rotate the lock cylinder 1 so that the lock ball slots 13 are aligned with the hollow portion 53 of the receiving sleeve 5. Then, remove the fixing element 54, so that the multiple first lock balls 131 can be taken out from the hollow portion 53, and then remove the lock key and insert another lock key to the lock cylinder 1. And then refill the lock ball slots 13 with another set of the multiple first lock balls 131 and put the stop protrusion 531 back to the hollow portion 53, and reposition the fixing element 54. Thereby, the multiple first lock balls 131 can be replaced easily to comply with the keys adapting different coding systems. The stop protrusion 531 can be accommodated in the hollow portion 53 in other manners, for example, the stop protrusion 531 is made of plastic and is accommodated in the hollow portion 53 matingly. In another embodiment, the receiving sleeve 5 includes a corresponding structure configured to remove or engage with the stop protrusion 531, wherein a part of the stop protrusion 531 is removably accommodated in the hollow portion 53.

In order to match the same set of multiple first lock balls 131 with the first lock key, which having the first section contour, and the second lock key, which having the second section contour, the first lock key and the second lock key are configured to have a same locking code set. For example, a profile of the teeth 6 of the key 4 of FIG. 13 is changed to a profile of the teeth of the first lock key 2 of FIG. 12 so that the key 4 and the first lock key 2 are applicable for the multiple lock balls 131 of FIG. 12.

While the first embodiments of the invention have been set forth for the purpose of disclosure, modifications of the disclosed embodiments of the invention as well as other embodiments thereof may occur to those skilled in the art. The scope of the claims should not be limited by the first embodiments set forth in the examples, but should be given the broadest interpretation consistent with the description as a whole.

What is claimed is:

1. A lock core device configured for matching multiple key cross-sectional shapes, the lock core device being adapted for use with a first lock key with a first section contour and a second lock key with a second section contour different from the first section contour of the first lock key, the lock core device comprising:

a lock cylinder including a keyway configured to separately receive each of the first lock key and the second lock key, wherein a position of a toothed portion of the first lock key, when received in the keyway, is axially offset from a position of a corresponding toothed portion of the second lock key, when received in the keyway.

2. The lock core device as claimed in claim 1, wherein an outer contour of the keyway is larger than or equal to an outer contour of a superimposition of the first section contour and the second section contour.

3. The lock core device as claimed in claim 1, wherein the first section contour is in any one of an S shape, an M shape, an X shape, an L shape, a K shape, a W shape, and a Y shape, and wherein the second section contour is in any one of an S shape, an M shape, an X shape, an L shape, a K shape, a W shape, and a Y shape.

4. The lock core device as claimed in claim 1, wherein the keyway defines a first edge and a second edge respectively formed on two sides of the keyway, and wherein at least one of the first edge and the second edge includes an accommodation portion configured to receive the first lock key or the second lock key.

5. The lock core device as claimed in claim 4, wherein the accommodation portion is recessed and radially corresponds to at least one of the first lock key and the second lock key.

6. The lock core device as claimed in claim 1, wherein the keyway defines a first edge and a second edge respectively formed on two sides of the keyway;

wherein the first edge of the keyway includes a first straight fence, a first tilted fence extending outward from a center of the keyway from a bottom of the first straight fence, a first peripheral fringe extending from a bottom of the first tilted fence, a first support fringe radially extending inward toward the center of the keyway from a bottom of the first peripheral fringe, and at least one first extending fringe extending from a bottom of the first support fringe; and wherein the second edge of the keyway includes a second straight fence corresponding to the first straight fence, a second tilted fence radially extending outward from the center of the keyway from a bottom of the second straight fence, a second peripheral fringe extending from a bottom of the second tilted fence, a second support fringe radially extending inward toward the center of the keyway from a bottom of the second peripheral fringe, and at least one second extending fringe extending from a bottom of the second support fringe.

7. The lock core device as claimed in claim 1, wherein the lock cylinder includes a plurality of lock ball slots axially spaced on and radially extending into the lock cylinder, each lock ball slot of the plurality of lock ball slots being configured to receive a respective first lock ball.

8. The lock core device as claimed in claim 7, further comprising a receiving sleeve configured to receive a plurality of second lock balls, the receiving sleeve including:

an accommodation groove axially defined therein and configured to receive the lock cylinder, and a plurality of notches each corresponding to a respective one of the plurality of lock ball slots of the lock cylinder.

9. The lock core device as claimed in claim 8, wherein the receiving sleeve further includes a hollow portion radially defined into an outer periphery thereof and corresponding to the plurality of lock ball slots, the hollow portion having a stop protrusion configured to shield the plurality of lock ball slots.

10. The lock core device as claimed in claim 9, wherein the receiving sleeve further includes a fixing element mounted on the outer periphery thereof and configured to adhere the stop protrusion within the hollow portion.

11. The lock core device as claimed in claim 1, wherein the first lock key includes a plurality of first teeth, and the second lock key includes a plurality of second teeth, wherein the lock cylinder includes a plurality of lock ball slots axially spaced on and radially extending into the lock cylinder, wherein the lock core device further comprises a plurality of first lock balls each accommodated in a corresponding lock ball slot of the plurality of lock ball slots, and wherein, when the first lock key is inserted into the keyway, each first lock ball of the plurality of first lock balls is driven by a corresponding tooth of the plurality of first teeth, and wherein, when the second lock key is inserted into the keyway, each first lock ball of the plurality of first lock balls is driven by a corresponding tooth of the plurality of second teeth.

12. The lock core device as claimed in claim 11, wherein a distance between a center of a middle lock ball slot of the plurality of lock ball slots and a center of the plurality of first teeth of the first lock key, when the first lock key is received in the keyway, is equal to a distance between the center of the middle lock ball slot of the plurality of lock ball slots and a center of the plurality of second teeth of the second lock key, when the second lock key is received in the keyway.

13. The lock core device as claimed in claim 11, wherein the plurality of lock ball slots are axially spaced equidistantly.

14. A key comprising:

a rod configured to match with the keyway of claim 1, wherein a profile of a section contour of the rod corresponds to a profile of a section contour of the keyway.

15. The lock core device as claimed in claim 1, wherein a number of teeth positions of the first lock key is the same as a number of teeth positions of the second lock key.

16. The lock core device as claimed in claim 1, wherein a middle portion of an outer contour of the keyway extends laterally in both directions relative to a top portion of the outer contour.

17. A method of configuring ball slots of a lock core device, the method comprising:

providing a lock cylinder, wherein the lock cylinder includes a keyway, and an outer contour of the keyway is larger than or equal to an outer contour of a superimposition of a first section contour of a first lock key and a second section contour of a second lock key;

providing a first plurality of teeth on a side of the first lock key, and a second plurality of teeth on a side of the second lock key; and providing a plurality of lock ball slots axially spaced on the lock cylinder and in communication with the keyway, wherein a position of a toothed portion of the first lock key, when received in the keyway, is axially offset from a position of a corresponding toothed portion of the second lock key, when received in the keyway.

18. The method as claimed in claim 17, further comprising:

selecting a lock ball slot of the plurality of lock ball slots as a datum lock ball slot, so that a projection position of the datum lock ball slot partially corresponds to the first plurality of teeth of the first lock key when received in the keyway, and partially corresponds to the second plurality of teeth of the second lock key when received in the keyway, wherein each lock ball slot of a remainder of the plurality of lock ball slots is spaced equidistantly.

19. The method as claimed in claim 18, wherein a middle lock ball slot of the plurality of lock ball slots is selected as the datum lock ball slot, so that a projection position of the middle lock ball slot corresponds to a middle tooth of the first lock key when received in the keyway, and corresponds to a middle tooth of the second lock key when received in the keyway.

* * * * *